June 15, 1926.  C. LE G. FORTESCUE  1,588,539

TESTING DEVICE

Filed Sept. 23, 1922

WITNESSES:

INVENTOR
Charles Le G. Fortescue.
BY
ATTORNEY

Patented June 15, 1926.

1,588,539

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

TESTING DEVICE.

Application filed September 23, 1922. Serial No. 590,180.

My invention relates to testing devices and particularly to methods of, and means for, calibrating electrical apparatus, such as transformers.

One object of my invention is to provide a device of the above indicated character that shall be simple and durable in construction, economical to manufacture and effective in its operation.

Another object of my invention is to provide a compact portable testing outfit for calibrating current and potential transformers.

Another object of my invention is to provide a simple and expeditious method of calibrating instrument transformers that shall greatly facilitate the determination of the phase angle and ratio of the transformers.

A further object of my invention is to provide a device for calibrating transformers that shall be readily operable by a single operator.

Heretofore it has been considered difficult to accurately check the ratio and phase angle of current and potential transformers in connection with instruments such as voltmeters, ammeters and wattmeters, especially where consistent and reliable results are desired.

Laboratory set-ups have been employed but these have not to my knowledge been adapted as portable outfits for convenient transportation. Further, it has been possible to conduct tests by the employment of two sets of certain standard instruments, but this method is not only subject to errors in the apparatus but also to the additional personal factor of requiring two observers instead of only one.

The use of portable transformer-testing devices for operation by a single operator has been suggested but, to the best of my knowledge, there has been none suggested that operates on the principle of my invention and that is so simple, economical and effective.

In practicing a preferred form of my invention, I employ a standard galvanometer or a dynamometer having the stationary coil excited from a separate source in synchronism with the source supplying current, an adjustable resistor and an adjustable reactor that are so connected to a standard transformer and to a transformer to be tested as to permit the ready calibration of the transformer under test by a null method.

Figure 1:
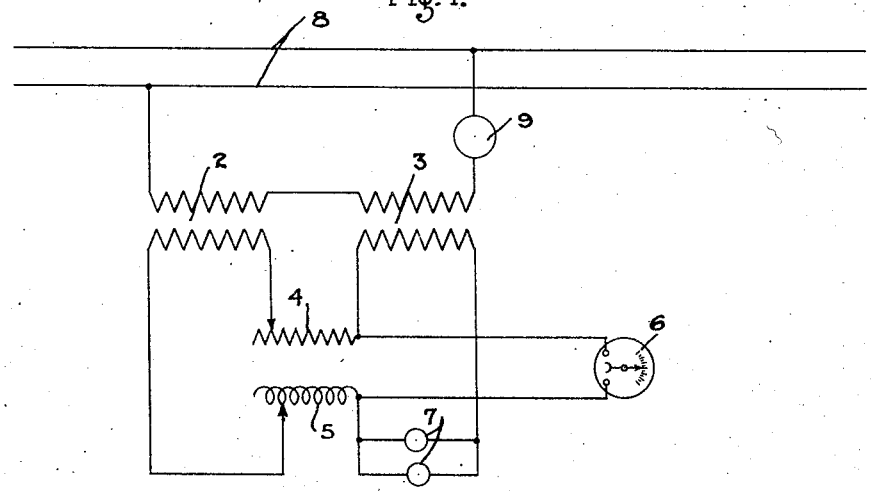
Figure 2:
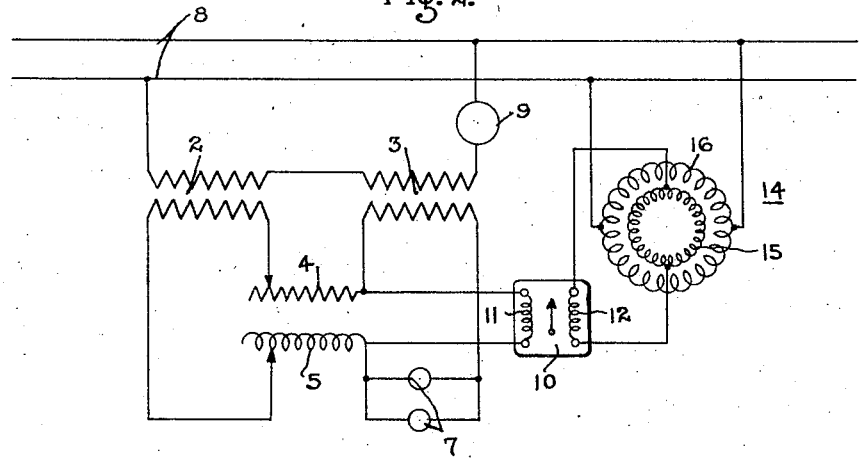

Figure 1 of the accompanying drawing is a diagrammatic view of the circuits, instruments and transformers employed in my invention and Figure 2 is a similar view of a modified form thereof.

As illustrated in Fig. 1, my invention comprises, in general, a standard transformer 2, a transformer 3 of which a test is desired, a variable non-inductive resistor 4, a variable reactor 5, a galvanometer 6, a load 7, a supply circuit 8 and an ammeter 9.

Initially, the standard transformer 2 is calibrated to obtain curves, of ratio and phase angle, over all ranges of primary current and values of secondary impedance. For instance, with a fixed value of non-inductive resistance in the secondary circuit of the standard transformer and with no inductance in said circuit, the power factor of the load is unity. Therefore, if the current in the primary circuit be varied over a certain range of values, a curve may be plotted showing the ratio of the primary current to the secondary current over that range. This ratio changes with the value of the secondary current by reason of losses in the transformer and both ratio and phase angle will be affected by the magnetizing current and by other factors which are usually contributory to transformer losses. Thus, one or more similar curves showing the change in ratio for different primary current values may be obtained by substituting different values of non-inductive resistance in the secondary circuit. Similarly, with a fixed value of reactance and no non-inductive resistance in the secondary circuit, a curve may be plotted showing the phase angle between the primary and the secondary currents at different values of the primary current.

The above actions or effects are reciprocal, so that, with a fixed current value in the primary circuit, a certain value of non-inductive resistance in the secondary circuit will be represented by a certain point on the ratio curve, as obtained by the above described method of calibration. Similarly and with a fixed current value in the primary circuit, if a certain value of reactance be introduced into the secondary circuit, the phase angle will correspond to a point on the phase-angle curve, as above obtained. Hence, for any value of primary current, whether the latter be fixed or varying at the time, any value of resistance and reactance will be represented by a certain ratio and phase angle on the curves.

Being provided with the above-mentioned curves, when it is desired to test the transformer 3, the primary windings of the transformers 2 and 3 are connected in series relation to each other and to the ammeter 9 between the conductors of the circuit 8. Also, the secondary windings of the transformers 2 and 3 are connected in series relation with the load 7, the variable reactor 5 and the variable non-inductive resistor 4, as shown. The galvanometer 6 is then connected across the zero ends of the reactor 5 and the resistor 4.

If the transformer 3 happens to be of the same ratio and phase angle as the standard transformer 2, for the same load 7, the galvanometer 6 will show no deflection when the reactor 5 and the resistor 4 are adjusted to have the same values of resistance and reactance as the load 7. However, if the transformer 3 is not of the same phase angle and ratio as the transformer 2, the galvanometer 6 may be balanced by adjusting the reactor 5 and the resistor 6 to some different value. This action compensates for the differences in phase angle and ratio between the transformers 2 and 3 and, when the galvanometer shows no deflection, the transformers are of the same phase angle and ratio. Hence, the amounts by which the reactor 5 and the resistor 4 were varied to obtain no deflection of the galvanometer 6, are measures of the phase angle and ratio. Suitable scales adjacent to the resistor 4 and the reactor 5 may be provided.

Since all values of phase angle and ratio of the standard transformer 2, for a given current in the primary circuit, are known, the secondary current is also known.

Hence, with known currents and known values of resistance and reactance, the phase angle and ratio of the transformer 3 may readily be obtained from the above described curves, and a proportionality factor for the particular transformer under test may be derived.

In the modification of my invention, shown in Fig. 2, a dynamometer 10, having the movable coil 11 connected across the zero ends of the resistor 4 and the reactor 5, and the stationary coil 12 connected to a phase-shifting device 14, is substituted for the galvanometer 6 of the device shown in Fig. 1. The coil 12 is connected to a winding 15 of the device 14, a coil 16 of which is connected to the circuit 8.

In general, the phase angle of the current will be affected most by the introduction of resistance, and the ratio will be affected most by the introduction of reactance. With the dynamometer-type instrument, as shown in Fig. 2, this may be taken advantage of and the phase angle of the exciting current shifted to points where the instrument is most sensitive to changes in resistance and reactance, respectively. These two phase positions will be in quadrature to each other.

When the galvanometer, of Fig. 1, is used, the adjustment may be made by changing each element in turn until zero reading is obtained.

While I have shown and described particular forms of my invention, changes may be effected therein without departing from the spirit and scope thereof, as set forth in the appended claims.

I claim as my invention:

1. In a testing device, the combination with a standard transformer and a transformer to be tested having series-related primary windings connected to an energizing circuit, and secondary windings connected in series-circuit relation, of a variable impedance device connected in said secondary circuit between two terminals of said secondary windings, a second variable impedance device connected in said secondary series circuit between two other terminals of said secondary windings, indicating means including cooperating elements, one of which is connected across said impedance devices, and a phase-shifting device embodying a primary element connected to the energizing circuit and a secondary element connected to another of said elements of the indicating means.

2. In a testing device, the combination with an energizing circuit, of a standard and an unknown transformer having the primary windings thereof connected in series relation to said circuit and the secondary windings thereof connected in series-relation to each other, means for varying the impedance of said secondary series circuit, indicating means including co-operating elements, one of which is connected across a portion of said secondary series circuit, and a phase-shifting device embodying a primary element connected to the energizing circuit and a secondary element connected to another of said elements of the indicating means.

3. In a testing device, the combination with a standard transformer and a transformer to be tested having series-related primary windings connected to an energizing circuit, and secondary windings connected in series-circuit relation, of a variable impedance device connected in said secondary series circuit between two terminals of said secondary windings, a second variable impedance device connected in said secondary series circuit between two other terminals of said secondary windings, and indicating means connected across said impedance devices.

4. In a testing device, the combination with a standard transformer and a transformer to be tested having series-related primary windings connected to an energizing circuit, and secondary windings connected in series-circuit relation, of a variable resistor connected in said secondary series circuit between two terminals of said secondary windings, a variable reactor connected in said secondary series circuit between two other terminals of said secondary windings, and indicating means connected across the resistor and the reactor.

5. The method of calibrating a transformer which comprises connecting the secondary winding thereof in series relation to the secondary winding of a similarly energized standard transformer and in adjusting the reactance only of the series circuit thus formed.

In testimony whereof, I have hereunto subscribed my name this 13th day of September 1922.

CHARLES LE G. FORTESCUE.